(12) United States Patent
Tsemekhman et al.

(10) Patent No.: US 11,100,529 B1
(45) Date of Patent: *Aug. 24, 2021

(54) METHODS, SYSTEMS, AND MEDIA FOR GENERATING PREDICTED INFORMATION RELATED TO ADVERTISEMENT VIEWABILITY

(71) Applicant: Integral Ad Science, Inc., New York, NY (US)

(72) Inventors: Kiril Tsemekhman, San Francisco, CA (US); Gijs Joost Brouwer, New York, NY (US); Rahul Ratnakar, Secaucus, NJ (US)

(73) Assignee: Integral Ad Science, Inc., New York, NY (US)

( * ) Notice: Subject to any disclaimer, the term of this patent is extended or adjusted under 35 U.S.C. 154(b) by 393 days.

This patent is subject to a terminal disclaimer.

(21) Appl. No.: 15/018,537

(22) Filed: Feb. 8, 2016

Related U.S. Application Data

(60) Provisional application No. 62/112,896, filed on Feb. 6, 2015.

(51) Int. Cl.
*G06Q 30/02* (2012.01)

(52) U.S. Cl.
CPC ..... *G06Q 30/0242* (2013.01); *G06Q 30/0272* (2013.01); *G06Q 30/0277* (2013.01)

(58) Field of Classification Search
CPC ....................................... G06Q 30/0207–0277
USPC ............................................. 705/14.1–14.73
See application file for complete search history.

(56) References Cited

U.S. PATENT DOCUMENTS

| 2014/0019262 | A1* | 1/2014 | Reitsma ................... G06N 5/02 705/14.71 |
| 2016/0180374 | A1* | 6/2016 | Cetintas ............. G06Q 30/0244 705/14.43 |

OTHER PUBLICATIONS

Kean Graham, "Ad Viewability Benchmarks in 2015", available on Jan. 7, 2015, retrieved from https://www.monetizemore.com/blog/ad-viewability-benchmarks-2015/#:~:text=Ad%20Viewability%20Benchmarks%20in%202015&text=A%20recent%20study%20conducted%20by,of%20the%20non%2Dviewable%20impressions (Year: 2015).*

* cited by examiner

*Primary Examiner* — Sam Refai
(74) *Attorney, Agent, or Firm* — Byrne Poh LLP

(57) ABSTRACT

In accordance with some embodiments of the disclosed subject matter, methods, systems, and media for generating predicted information related to advertisement viewability are provided.

18 Claims, 8 Drawing Sheets

Exchange Server 102

302 — LOAD CODE PROVIDED BY MEASUREMENT VENDOR

304 — TRANSMIT INFORMATION ASSOCIATED WITH A BROWSER AND ADVERTISEMENT LOCATION ACQUIRED FROM THE CODE

Measurement Vendor Server 104

306 — CALCULATE PREDICTED INFORMATION RELATED TO ADVERTISEMENT VIEWABILITY BASED ON THE RECEIVED INFORMATION

308 — TRANSMIT PREDICTED INFORMATION

310 — TRANSMIT PREDICTED INFORMATION

Seller Server 108

312 — DETERMINE ADVERTISEMENT PRICING PARAMETERS BASED ON PREDICTED INFORMATION

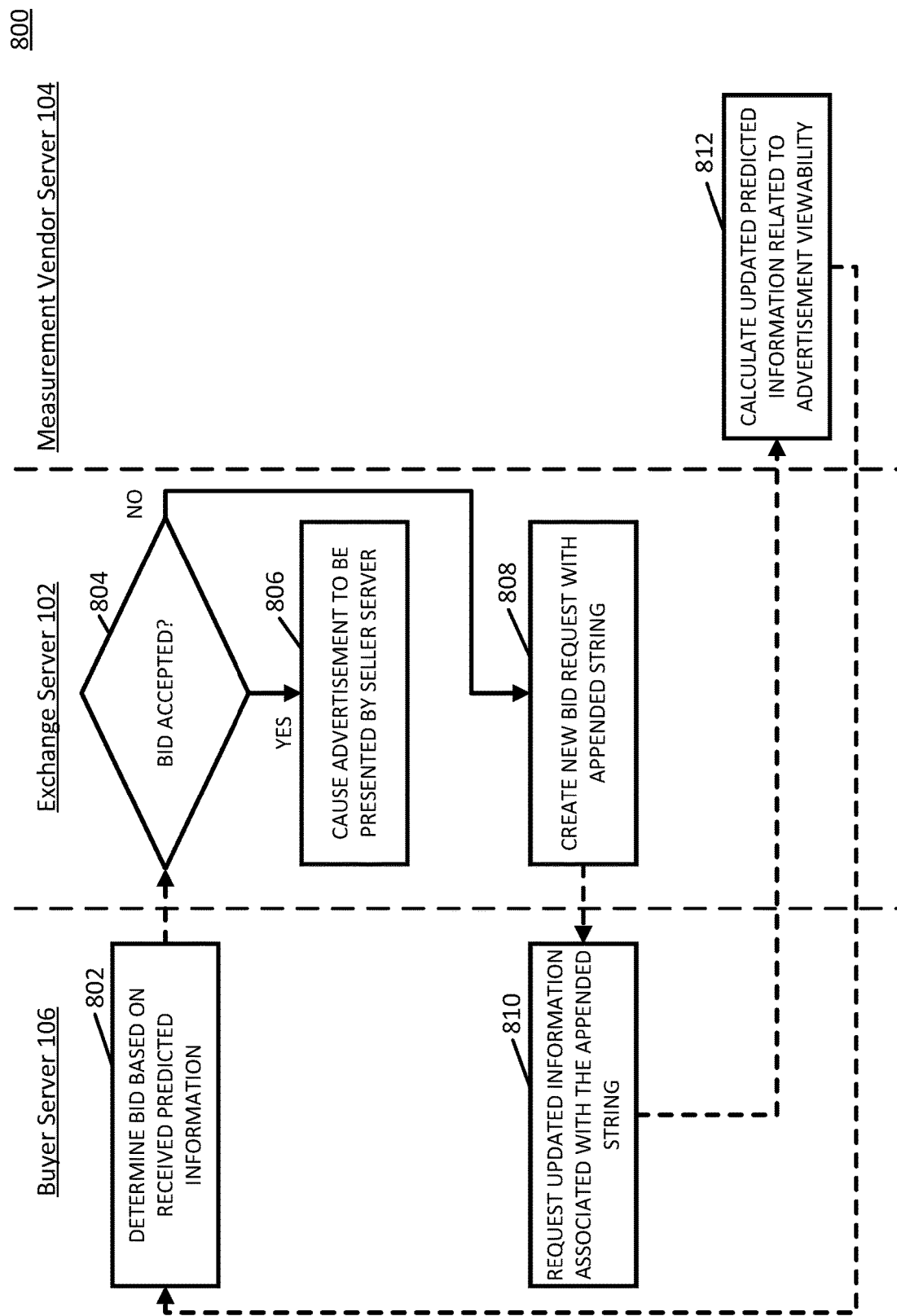

METHODS, SYSTEMS, AND MEDIA FOR GENERATING PREDICTED INFORMATION RELATED TO ADVERTISEMENT VIEWABILITY

CROSS-REFERENCE TO RELATED APPLICATIONS

This application claims the benefit of U.S. Provisional patent Application No. 62/112,896, filed Feb. 6, 2015, which is hereby incorporated by reference herein in its entirety.

TECHNICAL FIELD

The disclosed subject matter relates to methods, systems, and media for generating predicted information related to advertisement viewability.

BACKGROUND

Before an advertisement is rendered in a browser and is available for viewing for some period of time, actual measurement of viewability is impossible. However, in most scenarios, selling and buying decisions have to be made almost immediately after the page starts being loaded into the browser and the request for the advertisement reaches the seller advertisement server.

Accordingly, it is desirable to provide new methods, systems, and media for generating predicted information related to advertisement viewability.

SUMMARY

In accordance with some embodiments of the disclosed subject matter, methods, systems, and media for generating predicted information related to advertisement viewability are provided.

In accordance with some embodiments of the disclosed subject matter, a method for generating predicted information related to advertisement viewability is provided, the method comprising: receiving, from a code inserted in a web page associated with a seller of an advertisement placement, metrics associated with the web page; generating a string that includes one or more characters that each correspond to particular values of the received metrics; transmitting the string to the seller, wherein the string is appended to a URL associated with the web page; receiving, from a buyer of the advertisement placement, a first request for predicted information relating to advertisement viewability corresponding to the advertisement placement on the web page, wherein the first request includes the string; retrieving the metrics associated with the string; generating predicted information including a probability indicating a likelihood that an advertisement inserted in the advertisement placement on the web page will be viewed based on the retrieved metrics; transmitting the predicted information to the buyer; receiving, from the buyer, a second request for updated predicted information relating to advertisement viewability corresponding to the advertisement placement, wherein the second request includes the string; retrieving updated metrics associated with the string, wherein the updated metrics indicate a portion of the web page that is currently being presented; generating updated predicted information including an updated probability indicating a likelihood that an advertisement inserted in the advertisement placement will be viewed based on the updated metrics; and transmitting the updated predicted information to the buyer.

In some embodiments, the updated metrics further indicate whether a browser tab corresponding to the web page is currently active.

In some embodiments, the updated metrics further indicate a scrolling speed corresponding to a browser window displaying the web page.

In some embodiments, the updated predicted information includes an updated predicted duration of time that the advertisement inserted in the advertisement placement will be viewed based on the scrolling speed.

In some embodiments, the string indicates a format of the advertisement placement.

In some embodiments, the predicted information is generated based at least in part on historical data related to viewing of advertisements previously placed on the web page.

In accordance with some embodiments of the disclosed subject matter, a system for generating predicted information related to advertisement viewability is provided, the system comprising a hardware processor that is configured to: receive, from a code inserted in a web page associated with a seller of an advertisement placement, metrics associated with the web page; generating a string that includes one or more characters that each correspond to particular values of the received metrics; transmit the string to the seller, wherein the string is appended to a URL associated with the web page; receive, from a buyer of the advertisement placement, a first request for predicted information relating to advertisement viewability corresponding to the advertisement placement on the web page, wherein the first request includes the string; retrieve the metrics associated with the string; generate predicted information including a probability indicating a likelihood that an advertisement inserted in the advertisement placement on the web page will be viewed based on the retrieved metrics; transmit the predicted information to the buyer; receiving, from the buyer, a second request for updated predicted information relating to advertisement viewability corresponding to the advertisement placement, wherein the second request includes the string; retrieve updated metrics associated with the string, wherein the updated metrics indicate a portion of the web page that is currently being presented; generate updated predicted information including an updated probability indicating a likelihood that an advertisement inserted in the advertisement placement will be viewed based on the updated metrics; and transmit the updated predicted information to the buyer.

In accordance with some embodiments of the disclosed subject matter, a non-transitory computer-readable medium containing computer-executable instructions that, when executed by a processor, cause the processor to perform a method for generating predicted information related to advertisement viewability is provided, the method comprising: receiving, from a code inserted in a web page associated with a seller of an advertisement placement, metrics associated with the web page; generating a string that includes one or more characters that each correspond to particular values of the received metrics; transmitting the string to the seller, wherein the string is appended to a URL associated with the web page; receiving, from a buyer of the advertisement placement, a first request for predicted information relating to advertisement viewability corresponding to the advertisement placement on the web page, wherein the first request includes the string; retrieving the metrics associated with the string; generating predicted information including a probability indicating a likelihood that an advertisement inserted in the advertisement placement on the web page will be viewed based on the retrieved metrics; transmitting the predicted information to the buyer; receiving, from the buyer, a second request for updated predicted information relating to advertisement viewability corresponding to the advertisement placement, wherein the second request includes the string; retrieving updated metrics associated with the string, wherein the updated metrics indicate a portion of the web page that is currently being presented; generating updated predicted information including an updated probability indicating a likelihood that an advertisement inserted in the advertisement placement will be viewed based on the updated metrics; and transmitting the updated predicted information to the buyer.

In accordance with some embodiments of the disclosed subject matter, a system for generating predicted information related to advertisement viewability is provided, the system comprising: means for receiving, from a code inserted in a web page associated with a seller of an advertisement placement, metrics associated with the web page; means for generating a string that includes one or more characters that each correspond to particular values of the received metrics; transmitting the string to the seller, wherein the string is appended to a URL associated with the web page; means for receiving, from a buyer of the advertisement placement, a first request for predicted information relating to advertisement viewability corresponding to the advertisement placement on the web page, wherein the first request includes the string; means for retrieving the metrics associated with the string; generating predicted information including a probability indicating a likelihood that an advertisement inserted in the advertisement placement on the web page will be viewed based on the retrieved metrics; transmitting the predicted information to the buyer; means for receiving, from the buyer, a second request for updated predicted information relating to advertisement viewability corresponding to the advertisement placement, wherein the second request includes the string; means for retrieving updated metrics associated with the string, wherein the updated metrics indicate a portion of the web page that is currently being presented; means for generating updated predicted information including an updated probability indicating a likelihood that an advertisement inserted in the advertisement placement will be viewed based on the updated metrics; and means for transmitting the updated predicted information to the buyer.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 3 shows an example of an information flow diagram for using code provided by a measurement vendor to determine advertising pricing parameters in a private exchange in accordance with some embodiments of the disclosed subject matter.

FIG. 8 shows an example of an information flow diagram for presenting multiple bid opportunities for an advertisement placement in an open exchange in accordance with some embodiments of the disclosed subject matter.

DETAILED DESCRIPTION

Figure 1:
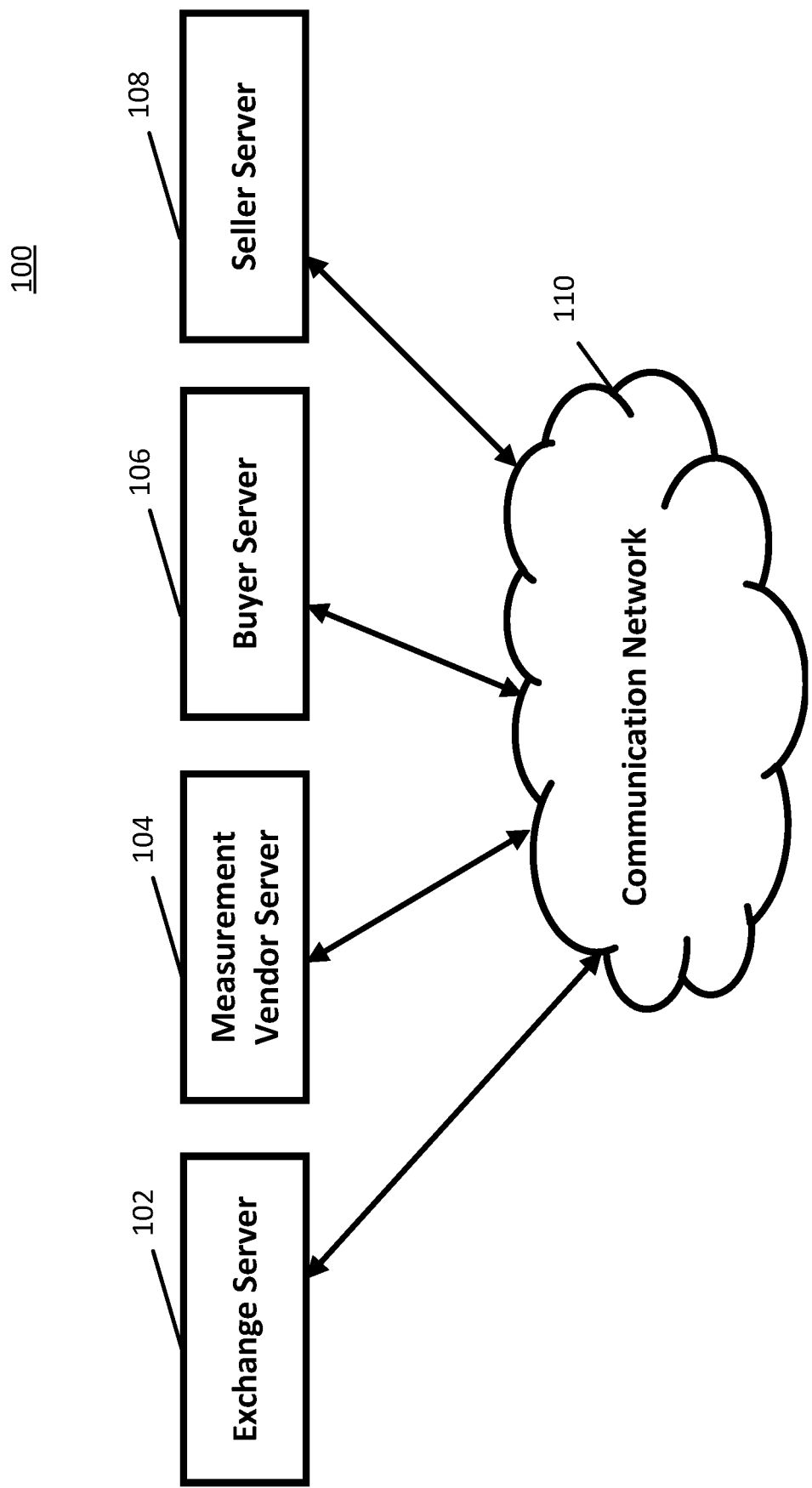
FIG. 1 shows a schematic diagram of an example of a system for generating predicted information related to advertisement viewability in accordance with some embodiments of the disclosed subject matter.

In accordance with various embodiments, mechanisms (which can include methods, systems, and media) for generating predicted information related to advertisement viewability are provided. In some embodiments, the mechanisms can be implemented on an exchange server, a seller server, one or more buyer servers, and a measurement vendor server.

In some embodiments, the mechanisms described herein can be used in a private exchange for buying and selling advertisements on a particular web page. In such embodiments, a code provided by the measurement vendor server can be loaded into a web page associated with the seller in which an advertisement is to be placed. In some embodiments, when the web page is loaded (e.g., on a user device), the code can determine metrics and/or information associated with the web page, such as a Uniform Resource Locator (URL) associated with the page, information associated with the browser that is displaying the web page, a screen resolution of the device that is displaying the web page, information (e.g., size and/or format) of an advertisement to be placed on the web page, and/or any other suitable information. The information and/or metrics can then be transmitted to the measurement vendor server, which can generate predicted information that an advertisement placed on the web page and/or at a particular position on the web page will be viewed and/or will be viewed for a particular duration of time. The predicted information can then be transmitted to the exchange server and/or to the seller server, which can use the predicted information to set advertising parameters, such as a floor price for a bid on an advertisement placement on the web page.

In some embodiments, the mechanisms described herein can be used in an open exchange, where buyers of advertisement placements on the web page can receive predicted information of advertisement viewability prior to bidding on the advertisement placement. In some such embodiments, the measurement vendor server can receive the information and/or metrics from the code loaded in the web page, and can generate a string that encodes the received information and/or metrics. The string can then be appended to the URL of the page (e.g., as a query string), and the URL with the appended string can be included in requests for bids on the advertisement placement. A buyer server can then request predicted information relating to advertisement viewability from the measurement vendor server using the appended string, and, in response to receiving the predicted information, can determine and/or generate a bid for the advertisement placement.

In some embodiments, in instances where an advertisement placement is not purchased at a first offering, the mechanisms described herein can allow additional opportunities to purchase the advertisement placement to be made available, with updated predicted information. For example, in some embodiments, the updated predicted information can include updated probabilities indicating likelihoods that an advertisement will be viewed, viewed for a particular duration of time, and/or selected. As a more particular example, if a user has scrolled up, down, left, or right on a page associated with the advertisement placement, the updated predicted information can include probabilities indicating whether the user is more or less likely to view the advertisement as a result of scrolling the page. In a private exchange, the seller server can updated advertisement pricing parameters (e.g., a floor price, and/or any other suitable pricing parameter) using the updated predicted information. Additionally or alternatively, in an open exchange, buyers can be given additional opportunities to bid on the advertisement placement, and can determine new bids based on the updated predicted information.

Turning to FIG. 1, an example 100 of hardware for generating predicted information related to advertisement viewability that can be used in accordance with some embodiments of the disclosed subject matter is shown. As illustrated, hardware 100 can include one or more servers, such as an exchange server 102, a measurement vendor server 104, one or more buyer servers 106, a seller server 108, and a communication network 110.

Exchange server 102 can be any suitable server for hosting an exchange on which an advertisement placement on a web page can be bought. For example, in some embodiments, exchange server 102 can load code provided by a measurement vendor that determines metrics associated with the page and a browser the page is loaded on, and can transmit the metrics to measurement vendor server 104, as shown in and described below in connection with FIG. 3. As another example, in some embodiments, exchange server 102 can create a bid request that is transmitted to one or more of buyer server(s) 106, and can select a particular buyer based on the received bids, as described below in connection with FIG. 5.

Measurement vendor server 104 can be any suitable server for providing a tag or code that determines metrics associated with advertisement viewability and which can generate predicted information indicating a probability that an advertisement on a particular page at a particular location will be viewed based on the metrics. For example, in some embodiments, measurement vendor server 104 can provide the tag or code to exchange server 102, and can receive the metrics from the tag or code when exchange server 102 causes the page to load in a browser window (e.g., in a user device). In some embodiments, measurement vendor server 104 can then generate predicted information of a probability that an advertisement located at a particular location on the page will be viewed, and can transmit the predicted information to exchange server 102, as shown in and described below in connection with FIGS. 3 and 4. As another example, in some embodiments, measurement vendor server 104 can receive the metrics from exchange server 102 and can create a string that encodes the metrics, which can then be appended to a URL associated with the page, as shown in and described below in connection with FIGS. 5 and 6. In some embodiments, one or more buyers can request information associated with the appended string from measurement vendor server 104, and measurement vendor server 104 can transmit predicted information indicating that an advertisement, located on the page associated with the string, will be viewed to the requesting buyers, as shown in and described below in connection with FIGS. 5 and 6.

In some embodiments, measurement vendor server 104 can store any suitable data for generating predicted information relating to advertisement viewability. For example, in some embodiments, measurement vendor server 104 can store information related to particular web sites and/or particular URLs. As a more particular example, in some embodiments, measurement vendor server 104 can store information related to traffic on a particular web site (e.g., number of visits, number of unique visits, average duration of time spent on the web site, and/or any other suitable metric). As another more particular example, in some embodiments, measurement vendor server 104 can store information related to advertisement viewing on a particular web site (e.g., how often advertisements of a particular type are viewed and/or clicked from the web site, and/or any other suitable information). As yet another more particular example, in some embodiments, measurement vendor server 104 can store information indicating that a particular web site belongs to a particular category, such as whether the web site relates to a particular genre (e.g., an online retailer, a news site, a social networking site, and/or any other suitable category) and/or is a spam site (e.g., based on information indicating that the URL is a misspelling of a different URL, and/or based on any other suitable information).

Buyer server(s) 106 can be one or more servers associated with buyers for advertisement placements. In some embodiments, buyer server(s) 106 can bid on advertisement placements. For example, in some embodiments, buyer server(s) 106 can transmit a bid to purchase an advertisement placement to exchange server 102. As another example, in some embodiments, buyer server(s) 106 can determine the bid based on information received from measurements vendor server 104, as shown in and described below in connection with FIGS. 5 and 6.

Seller server 108 can be any server associated with a web page on which an advertisement is to be placed. For example, in some embodiments, seller server 108 can be associated with a particular web site, a particular company, a particular person, and/or any other suitable entity. In some embodiments, seller server 108 can determine advertising parameters, such as a floor price and/or a clearing price associated with a particular advertisement placement on the web page. For example, as shown in and described below in connection with FIG. 3, in some embodiments, seller server 108 can receive predicted information relating to the viewability of an advertisement placed in the advertisement placement being sold, and can determine a floor price based on the received predicted information.

Communication network 110 can be any suitable combination of one or more wired and/or wireless networks in some embodiments. For example, communication network 110 can include any one or more of the Internet, a mobile data network, a satellite network, a local area network, a wide area network, a telephone network, a cable television network, a WiFi network, a WiMax network, and/or any other suitable communication network.

Although exchange server 102, measurement vendor server 104, buyer server(s) 106, and seller server 108 are illustrated as separate devices, any one or more of these devices can be combined into one device in some embodiments. Also, although only one each of exchange server 102, measurement vendor server 104, buyer server(s) 106, and seller server 108 are shown in FIG. 1 to avoid over-complicating the figure, any suitable one or more of each device can be used in some embodiments.

Figure 2:
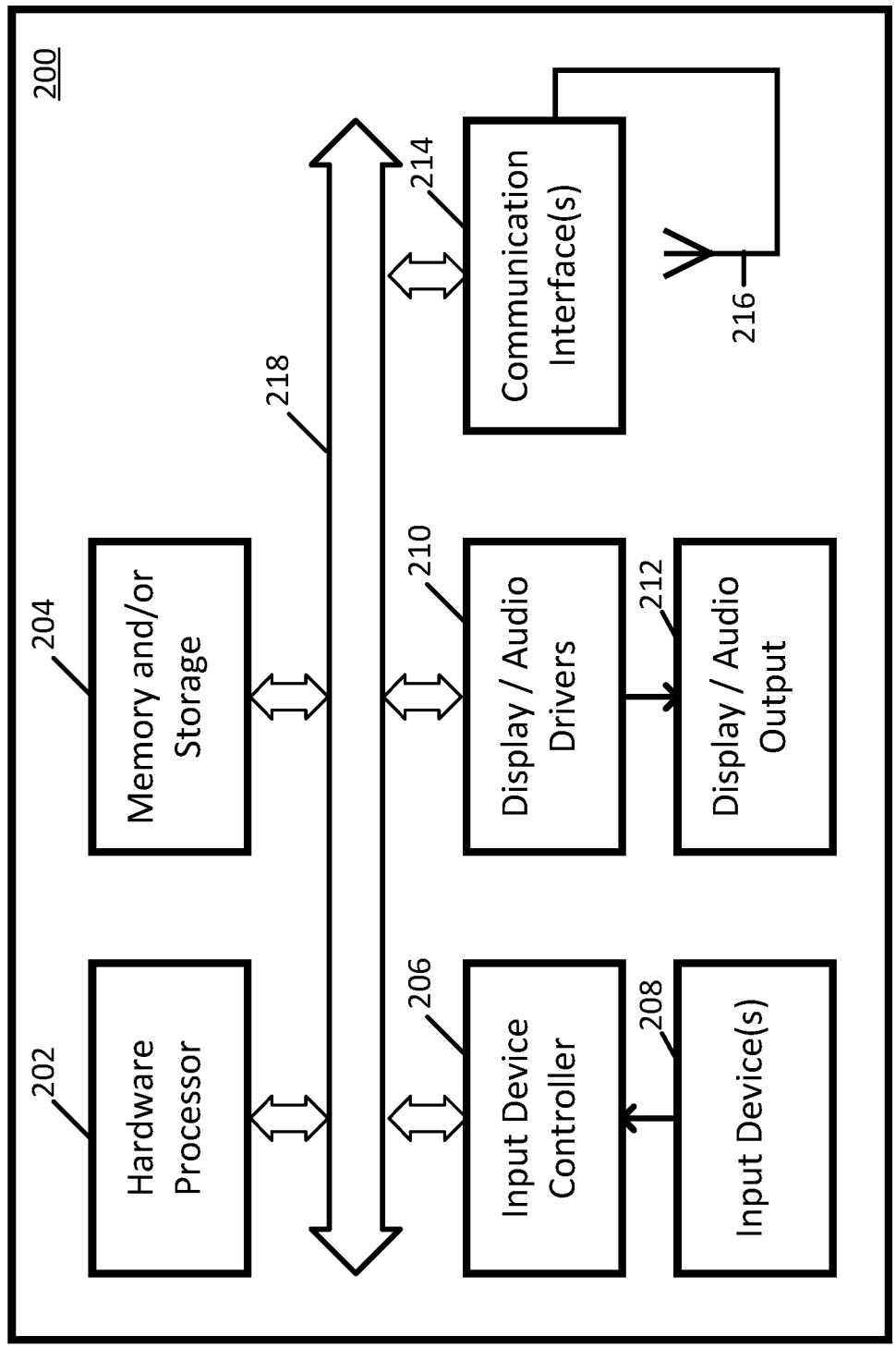
FIG. 2 shows an example of hardware that can be used in a server and/or a user device in accordance with some embodiments of the disclosed subject matter.

Exchange server 102, measurement vendor server 104, buyer server(s) 106, and seller server 108 can be implemented using any suitable hardware in some embodiments. For example, in some embodiments, devices 102, 104, 106, and 108 can be implemented using any suitable general purpose computer or special purpose computer. For example, a server may be implemented using a special purpose computer. Any such general purpose computer or special purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general purpose computer or a special purpose computer in some embodiments.

Memory and/or storage 204 can be any suitable memory and/or storage for storing programs, data, media content, and/or any other suitable information in some embodiments. For example, memory and/or storage 204 can include random access memory, read-only memory, flash memory, hard disk storage, optical media, and/or any other suitable memory.

Input device controller 206 can be any suitable circuitry for controlling and receiving input from a device in some embodiments. For example, input device controller 206 can be circuitry for receiving input from a touch screen, from one or more buttons, from a voice recognition circuit, from a microphone, from a camera, from an optical sensor, from an accelerometer, from a temperature sensor, from a near field sensor, and/or any other type of input device.

Display/audio drivers 210 can be any suitable circuitry for controlling and driving output to one or more display/audio output circuitries 212 in some embodiments. For example, display/audio drivers 210 can be circuitry for driving an LCD display, a speaker, an LED, or any other type of output device.

Communication interface(s) 214 can be any suitable circuitry for interfacing with one or more communication networks, such as network 110 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network in some embodiments. In some embodiments, antenna 216 can be omitted when not needed.

Bus 218 can be any suitable mechanism for communicating between two or more components 202, 204, 206, 210, and 214 in some embodiments.

Any other suitable components can be included in hardware 200 in accordance with some embodiments.

Turning to FIG. 3, an example 300 of an information flow diagram for using code provided by a measurement vendor to determine advertising pricing parameters in a private exchange is shown in accordance with some embodiments of the disclosed subject matter. In some embodiments, portions of information flow diagram 300 can be implemented on exchange server 102, measurement vendor server 104, and seller server 108.

At 302, exchange server 102 can load a tag or a code provided by a measurement vendor (e.g., transmitted to exchange server 102 from measurement vendor server 104 via communication network 110). The tag or code can be of any suitable format. For example, in some embodiments, the tag or code can be Javascript code that is loaded into a browser by exchange server 102 when a page is rendered on a user device (e.g., on a mobile device such as a mobile phone or tablet computer, on a laptop computer, on a desktop computer, on a television, on a wearable computer, and/or any other suitable type of user device).

In some embodiments, the tag or code can cause metrics related to the page, the browser, an advertisement to be inserted into the page, and/or any other suitable information to be determined. For example, in some embodiments, the metrics can include a Universal Resource Locator (URL) associated with the page and/or an identifier of the browser (e.g., a name associated with the browser, a version number associated with the browser, and/or any other suitable information). As another example, in some embodiments, the metrics can include information related to the advertisement to be inserted, such as a format and/or size of the advertisement, whether the advertisement will be viewable as the page is loaded by the browser, a location of the advertisement, and/or any other suitable information.

At 304, exchange server 102 can transmit the determined metrics to measurement vendor server 104. For example, in some embodiments, exchange server 102 can transmit the metrics via communication network 110.

At 306, measurement vendor server 104 can determine and/or calculate a probability indicating a likelihood that an advertisement placed on the page associated with the received metrics will be viewed and/or will be viewed for a particular duration of time. Additionally or alternatively, in some embodiments, measurement vendor server 104 can determine other information, such as a floor and/or clearing price for a particular type of advertisement (e.g., an advertisement of a particular size, an advertisement in a particular category, an advertisement of a particular quality level, an advertisement with a particular probability of being viewed, and/or any other suitable type) based on the predicted probability. In some embodiments, any suitable technique or combination of techniques, such as those described below in connection with FIG. 4, can be used.

At 308, measurement vendor server 104 can transmit the predicted probability that an advertisement placed on the page will be viewed to exchange server 102.

At 310, exchange server 102 can transmit the information relating to the advertisement viewability predicted information to the seller, for example, by transmitting the information to seller server 108 via communication network 110.

At 312, seller server 108 can receive the predicted information relating to advertisement viewability, and can determine advertisement pricing parameters based on the received predicted information. For example, in some embodiments, seller server 108 can determine a floor price for an advertisement to be placed in a particular position. As a more particular example, in some embodiments, seller server 108 can set the floor price based on a received probability that an advertisement on the web page and/or in a particular position on the web page will be viewed, a probability that the advertisement will be viewed for a particular duration of time, and/or any other suitable predicted information. As a specific example, in some embodiments, seller server 108 can determine that the floor price is to be relatively higher in response to receiving predicted information that a probability that an advertisement will be viewed is above a predetermined threshold (e.g., greater than 50% chance, greater than 70% chance, and/or any other suitable probability) compared to if the probability is below the predetermined threshold.

Figure 4:
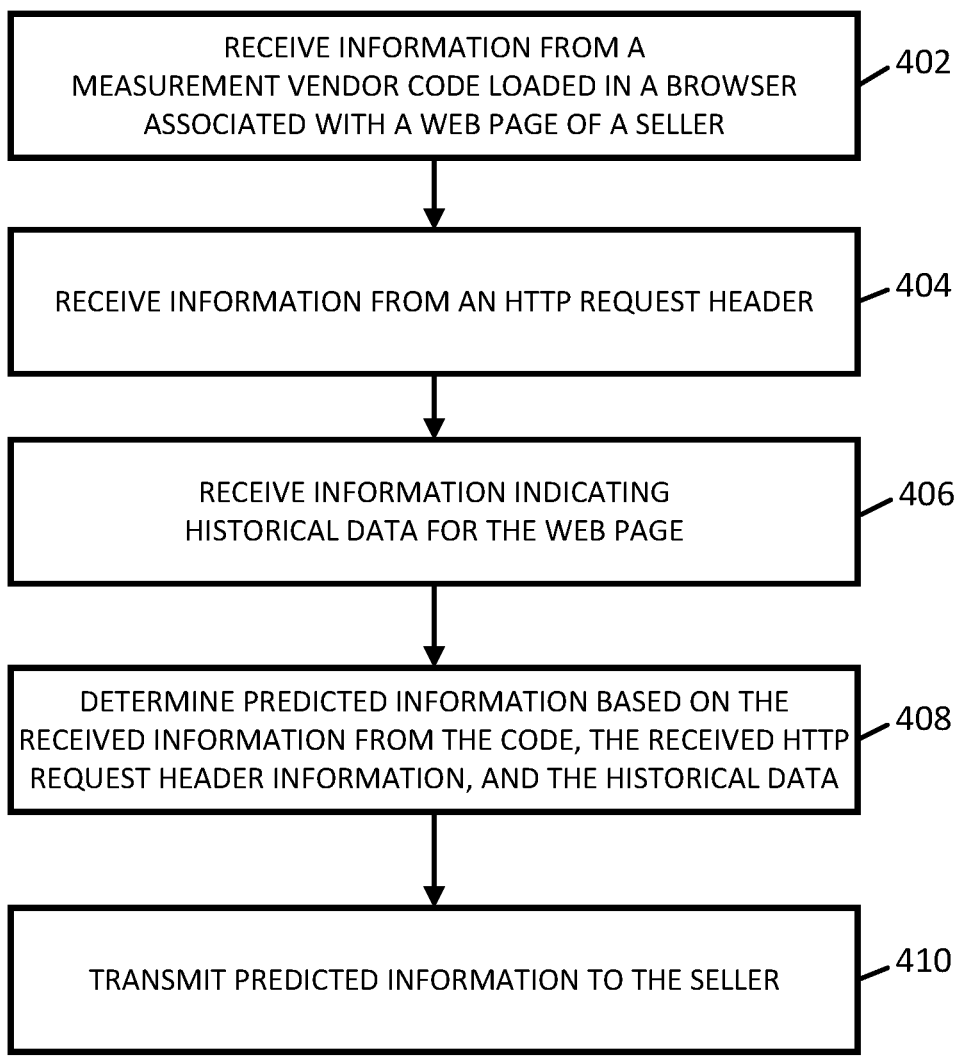
FIG. 4 shows an example of a process for generating predicted information related to advertisement viewability and transmitting the predicted information to a seller in accordance with some embodiments of the disclosed subject matter.

Turning to FIG. 4, an example 400 of a process for determining predicted information including a probability indicating a likelihood that an advertisement placed on a particular page will be viewed is shown in accordance with some embodiments of the disclosed subject matter. In some embodiments, portions of process 400 can be implemented on measurement vendor server 104.

Process 400 can begin by receiving metrics from a measurement vendor code loaded in a browser associated with a web page of a seller at 402. As described above in connection with block 302 of FIG. 3, in some embodiments, the metrics can include information such as a URL associated with the web page, an identifier of the browser, a format and/or size of the advertisement, whether the advertisement is to be viewable as the page is loaded by the browser, a location of the advertisement, and/or any other suitable information.

Process 400 can receive information from an HTTP request header at 404. For example, in some embodiments, the information can include an IP address of the computer accessing the web page of the seller, a local time at the computer accessing the web page of the seller, a day of the week, information associated with cookies stored on the computer accessing the web page, information relating to a referring page visited prior to accessing the web page of the seller, and/or any other suitable HTTP request information.

Process 400 can receive information indicating historical data for the web page at 406. For example, in some embodiments, the information can be related to historical data associated with advertisements placed on the web page. As a more particular example, in some embodiments, the information can indicate an average viewability of an advertisement placed on the web page (e.g., an average number of times an advertisement on the web page was viewed, an average number of times an advertisement in a particular category was viewed, an average number of times an advertisement was viewed on a particular day and/or at a particular time of day, and/or any other suitable viewability information), information related to quality of impressions of an advertisement on the web page (e.g., an average number of times an advertisement on the web page was selected, and/or any other suitable information), and/or any other suitable information related to historical data associated with advertisements on the web page. As another example, in some embodiments, the information can be related to content on the web page. As a more particular example, in some embodiments, the information can indicate a category associated with the web page (e.g., that the web page typically presents news stories, that the web page is associated with a retailer of a particular type of goods, and/or any other suitable type of category). In some embodiments, the historical data can be stored on any suitable server(s), such as measurement vendor server 104.

Process 400 can determine predicted information related to advertisement viewability based on the received measurements, the received information from the HTTP request header, and the received information relating to historical data at 408. In some embodiments, the predicted information can include predicted information related to the quality of the advertisement impression. For example, in some embodiments, the predicted information can include a probability indicating a likelihood that the advertisement will be viewed, a duration of time (e.g., five seconds, ten seconds, one minute, and/or any other duration of time) that the advertisement will be viewed, a probability indicating a likelihood that the advertisement will be clicked and/or selected, and/or any other suitable predicted information. As another example, in some embodiments, the predicted information can include a probability that the advertisement placement is fraudulent. As a specific example, in some embodiments, the predicted information can include a probability indicating a likelihood that the web page corresponds to a misspelling of a different web page.

Note that, in some embodiments, measurement vendor server 104 can additionally or alternatively calculate floor prices and/or clearing prices based on the predicted information, and can transmit the floor prices to exchange server 102 and/or to seller server 108. For example, in some embodiments, measurement vendor server 104 can calculate floor prices for particular types of advertisement, such as advertisements on a particular domain (e.g., advertisements placed on a particular domain), advertisements of a particular size, advertisements of a particular category (e.g., advertisements for particular types of goods, events, etc.), and/or for any other suitable types of advertisements. As another example, in some embodiments, measurement vendor server 104 can calculate floor prices based on the predicted quality of the advertisement impression. As a particular example, measurement vendor server 104 can calculate a floor price based on the predicted probability that the advertisement will be viewed and/or will be viewed for a particular duration of time, a predicted probability that the advertisement will be clicked and/or selected, and/or based on any other suitable predicted information related to quality.

Process 400 can determine the predicted information using any suitable technique or combination of techniques. For example, in some embodiments, process 400 can use machine learning techniques (e.g., neural networks, decision trees, classification techniques, Bayesian statistics, and/or any other suitable techniques) to determine the predicted information. Additionally, in some embodiments, process 400 can use any suitable information and/or combination of information to determine the predicted information. For example, in some embodiments, process 400 can use historical data related to advertisements previously presented on the web page to determine the predicted information. As a more particular example, in some embodiments, process 400 can use information indicating probabilities at which advertisements on the web page have been viewed (e.g., on a particular day of the week, at a particular time of day, and/or relating to any other suitable time frame). As another more particular example, in some embodiments, process 400 can use information indicating a category of the web page (e.g., whether the web page is a news site, an online retailer, a social networking site, and/or belongs to any other suitable category).

Process 400 can transmit the predicted information to the seller at 408. For example, in some embodiments, process 400 can transmit the predicted information to exchange server 102 and/or to seller server 108 via communication network 110.

Figure 5:
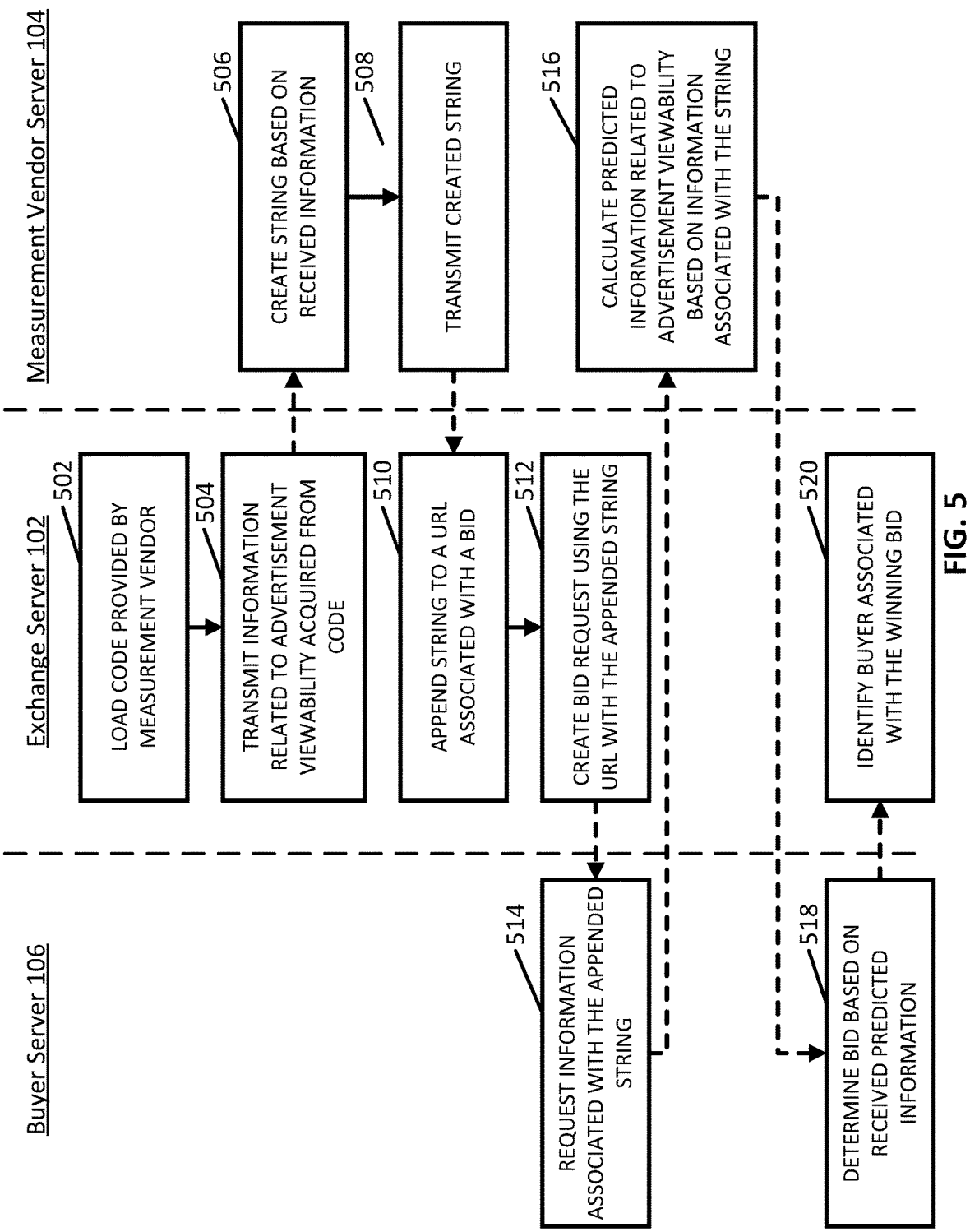
FIG. 5 shows an example of an information flow diagram for receiving bids for an advertisement placement in an open exchange based on information represented in a string appended to a URL in accordance with some embodiments of the disclosed subject matter.

Turning to FIG. 5, an example 500 of an information flow diagram for receiving bids for an advertisement placement in an open exchange based on information represented in a string appended to a URL is shown in accordance with some embodiments of the disclosed subject matter. As illustrated, in some embodiments, portions of information flow diagram 500 can be implemented on exchange server 102, measurement vendor server 104, and one or more buyer server(s) 106.

At 502, exchange server 102 can load code provided by the measurement vendor into a web page associated with the seller and/or exchange server 102. Exchange server 102 can use any suitable technique or combination of techniques, such as those described above in connection with block 302 of FIG. 3. As shown in and described above in connection with FIG. 3, the code can determine information and/or metrics related to a web page on which an advertisement is to be placed, such as a URL of the page and/or information related to a browser on which the page is displayed. The code can additionally and/or alternatively determine information related to the advertisement placement, such as a size and/or format of the advertisement, a location of the advertisement within the page, and/or any other suitable information.

At 504, exchange server 102 can determine metrics related to advertisement viewability and can transmit the metrics to measurement vendor server 104. As described above in connection with block 304 of FIG. 3, in some embodiments, the metrics can be related to the web page and/or the browser in which the code has been inserted, information related to presentation of the advertisement, and/or any other suitable information.

At 506, measurement vendor server 104 can create a string based on the received metrics. In some embodiments, the string can be of any suitable length (e.g., three characters, five characters, ten characters, twenty characters, and/or any other suitable length) and can include any suitable combination of letters, numbers, and/or other characters. In some embodiments, any suitable information can be encoded in the string. For example, in some embodiments, the string can encode an identifier of the exchange (e.g., an identifier indicating a particular auction on exchange server 102), a format and/or size of the advertisement to be inserted, whether the advertisement will be viewable as the web page is loaded, a location of the advertisement, a code for a particular iFrame map associated with the position of the advertisement, an identifier of a browser and/or a version of a browser on which the web page is being viewed, resolution of the screen on which the web page is being viewed, local time at the device on which the web page is being viewed, and/or any other suitable information. A specific example of an encoded string is "720033219", which can indicate particular information as follows:

| | |
|---|---|
| 7 | Exchange identifier |
| 2 | Advertisement size = 728 × 90 |
| 0 | Advertisement not viewable on-load |
| 0 | Advertisement location not measured |
| 3 | Code for iFrame map node |
| 3 | Browser = Chrome |
| 6 | Chrome version 31 |
| 2 | Screen resolution = 1200 × 840 |
| 19 | Local time |

Note that, in some embodiments, one or more of the items of information encoded in the string can be predicted, for example, using techniques and information described above in connection with FIG. 4. As a specific example, in some embodiments, whether the advertisement will be viewable as the web page is loaded can be predicted based on historical data associated with advertisements placed on the web page in the past. In some embodiments, measurement vendor server 104 can create the string using any suitable technique(s), such as those described below in connection with block 604 of FIG. 6.

Measurement vendor server 104 can transmit the created string to exchange server 102 at 508. In some embodiments, the string can be transmitted via communication network 110.

At 510, exchange server 102 can append the received string to a URL associated with the web page in which an advertisement is to be inserted. For example, in some embodiments, the string can be appended to the URL as a query string.

Exchange server 102 can create a bid request that includes the URL with the appended string at 512. In some embodiments, the bid request can include any other suitable information, such as a name of an entity (e.g., a name of a company, a name of a service, a name of a person, and/or any other suitable name) associated with exchange server 102, and/or any other suitable information. In some embodiments, the bid request can be stored and/or presented from any suitable device, such as exchange server 102.

At 514, one or more buyer server(s) 106 can view the bid request and can request information associated with the string appended to the URL from measurement vendor server 104. Note that, in some embodiments, each buyer server 106 can be associated with a different entity.

At 516, measurement vendor server 104 can receive the requests for information from buyer server(s) 106, and can calculate advertisement viewability predicted information based on metrics associated with the appended string. As described above in connection with FIG. 4, the advertisement viewability predicted information can include a probability indicating a likelihood that the advertisement will be viewed, a predicted duration of time that the advertisement will be viewed, and/or a probability indicating a likelihood that the advertisement will be clicked and/or selected. In some embodiments, measurement vendor server 104 can determine the predicted information using any suitable technique(s), such as those described below in connection with block 610 of FIG. 6. Measurement vendor server 104 can then transmit the predicted information to buyer server(s) 106.

At 518, one or more of buyer server(s) 106 can determine bids for the advertisement placement based on the predicted information received from measurement vendor server 104. For example, in some embodiments, buyer server(s) 106 can determine that a bid should be higher if the predicted probability that the advertisement will be viewed and/or the predicted probability that the advertisement will be selected is greater than a predetermined threshold (e.g., greater than 50%, greater than 70%, and/or any other suitable probability). Buyer server(s) 106 can then transmit the bids to exchange server 102 via communication network 110.

At 520, exchange server 102 can identify the buyer associated with the winning bid. For example, in some embodiments, exchange server 102 can identify the buyer associated with the highest bid. In some embodiments, exchange server 102 can identify the highest bid received within a particular time period (e.g., within a second, ten seconds, a minute, and/or any other suitable time period) of the bid request being presented.

Figure 6:
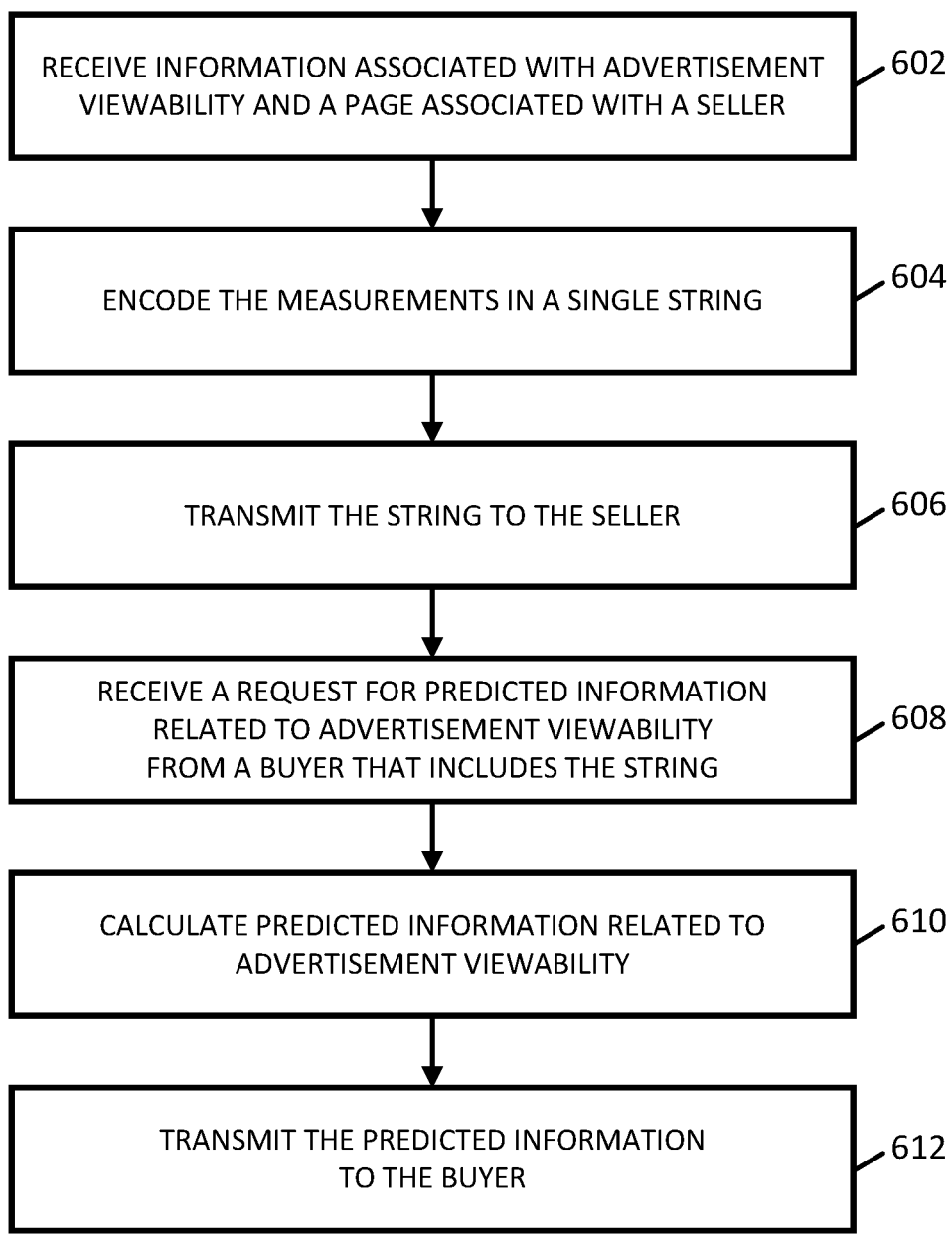
FIG. 6 shows an example of a process for generating a string that encodes advertisement viewability metrics and generating predicted information relating to advertisement viewability based on the metrics in accordance with some embodiments of the disclosed subject matter.

Turning to FIG. 6, an example 600 of a process for encoding information and/or metrics related to advertisement viewability in a string and retrieving the metrics in response to a request from a buyer is shown in accordance with some embodiments of the disclosed subject matter. In some embodiments, portions of process 600 can be implemented on measurement vendor server 104.

Process 600 can begin by receiving information and/or metrics related to advertisement viewability and a web page on which an advertisement is to be presented at 602. As described above in connection with FIGS. 3-5, in some embodiments, the metrics can be received from a measurement code loaded into the web page by exchange server 102, and can indicate information relating to the web page, a browser in which the web page is presented, a format in which the advertisement is to be presented, and/or any other suitable information.

Process 600 can encode the measurements in a string of characters at 604. As described above in connection with block 506 of FIG. 5, the string can be of any suitable length and can include characters of any suitable type. Process 600 can create the string using any suitable technique or combination of techniques. For example, in some embodiments, a particular value corresponding to a metric (e.g., a particular screen resolution, a particular browser version, and/or any other suitable value) can be used as a key in a look-up table to determine a value (e.g., one or more characters) to be included in the string. As a specific example, if process 600 receives information indicating that the screen resolution of a device being used to present the web page is 1200×480, process 600 can look up the particular screen resolution in a table to determine the corresponding characters to be included in the string (e.g., '2', 'A', 'a$e', and/or any other suitable character(s)). In some embodiments, process 600 can append characters in a particular order. For example, in some embodiments, process 600 can determine that characters representing a screen resolution are to be included in the string before characters representing a browser version.

Process 600 can transmit the created string to the seller at 606. For example, as described above in connection with FIG. 5, in some embodiments, process 600 can transmit the string to exchange server 102 via communication network 110.

Process 600 can receive a request for predicted information relating to advertisement viewability from a buyer at 608. As described above in connection with block 514 of FIG. 5, in some embodiments, the request can be received from buyer server 106. In some embodiments, the request can include the string, which was appended to a URL associated with the web page by exchange server 102, as described above in connection with block 510 of FIG. 5. In response to receiving the request, process 600 can decode the string to retrieve the metrics corresponding to the string. As a specific example, if the portion of the string corresponding to a screen resolution includes the character '2', process 600 can determine that the corresponding screen resolution is 1200×840.

Process 600 can decode the string using any suitable technique or combination of techniques. For example, in some embodiments, process 600 can use a look-up table to convert particular characters of the string to particular values (e.g., a particular screen resolution, a particular browser version, and/or any other suitable values). In some embodiments, process 600 can use any suitable information to decode the string. For example, in some embodiments, the information can indicate that particular information (e.g., a screen resolution) is encoded by a particular number of characters at a predetermined position in the string (e.g., the $8^{th}$ and $9^{th}$ characters).

Process 600 can use the retrieved metrics to calculate predicted information relating to advertisement viewability at 610. As described above in connection with block 408 of FIG. 4, the predicted information can include a probability indicating a likelihood that the advertisement will be viewed, a duration that the advertisement will be viewed, a probability indicating a likelihood that the advertisement will be selected, a probability indicating a likelihood that the advertisement will be fraudulent, and/or any other suitable predicted information. Additionally, as described above in connection with block 408 of FIG. 4, process 600 can use any suitable information (e.g., historical data relating to the web page and/or the seller, metrics associated with the created string, information from an HTTP request header, and/or any other suitable information) and/or any suitable technique(s) (e.g., machine learning techniques, statistical techniques, and/or any other suitable techniques) to determine the predicted information.

Process 600 can transmit the predicted information to the buyers that requested information at 612. For example, as described above in connection with block 516 of FIG. 5, in some embodiments, process 600 can transmit the predicted information to one or more buyer servers 106.

In some instances, an advertisement placement is not purchased at the first opportunity. In some such instances, a seller may want to update pricing parameters (e.g., a floor price for the advertisement placement) based on the position of the advertisement placement within a page relative to a portion of the page that is currently being presented. For example, the seller can increase the floor price in response to determining that an advertisement placement at the bottom of a page is more likely to be viewed because a user viewing the page is currently and/or has recently scrolled down on the page, as described below in connection with FIG. 7. Additionally or alternatively, in some embodiments, an exchange server may solicit bids from buyers multiple times, as described below in connection with FIG. 8. For example, if no buyer purchases the advertisement placement at its initial offering, the exchange server can solicit bids a second time, and the bids submitted by the buyer(s) can be updated based on a new relative position of the advertisement placement.

Figure 7:
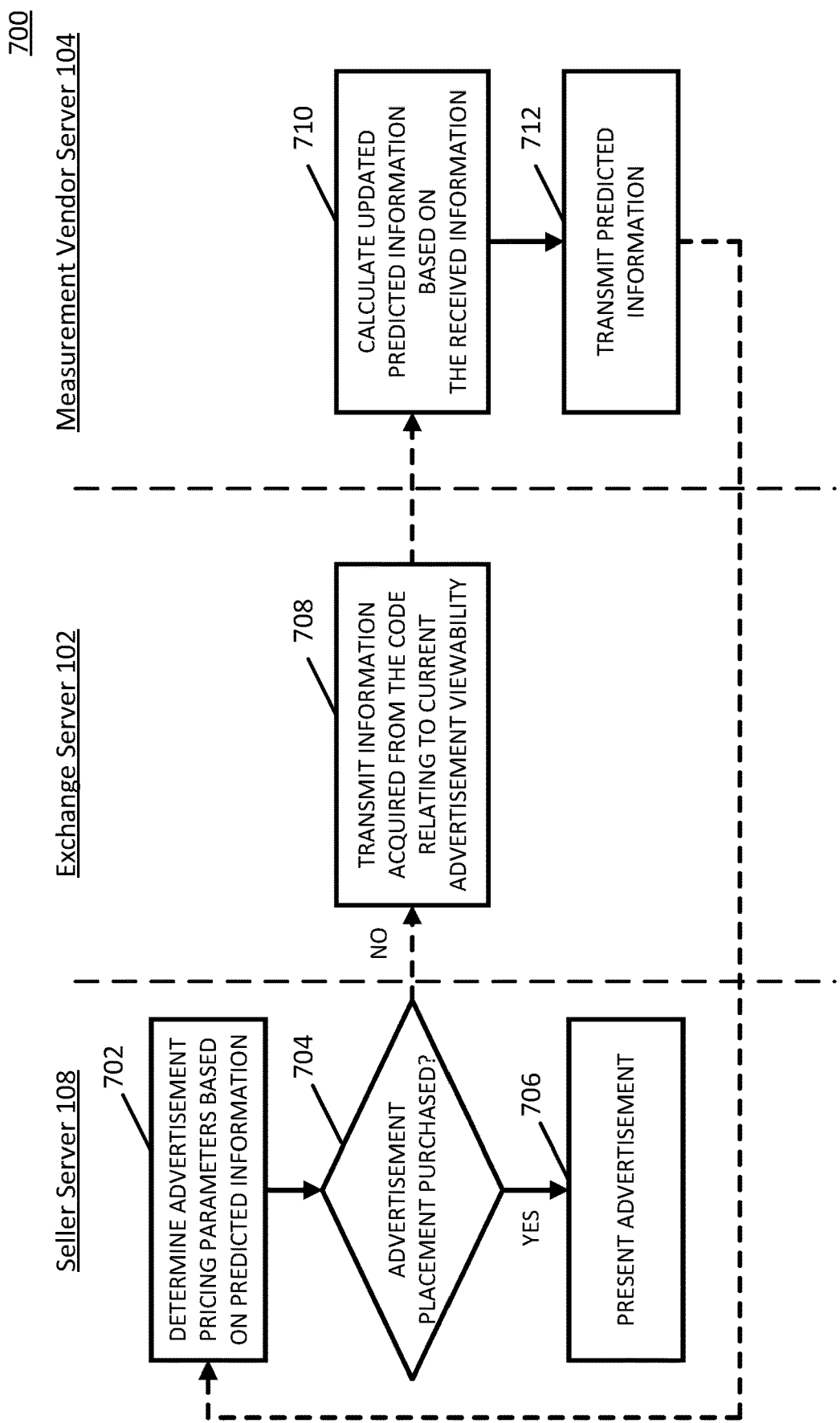
FIG. 7 shows an example of an information flow diagram for updating advertising pricing parameters based on updated predicted information relating to advertisement viewability in accordance with some embodiments of the disclosed subject matter.

FIG. 7 shows an example 700 of an information flow diagram for updating advertising pricing parameters based on updated predicted information relating to advertisement viewability in accordance with some embodiments of the disclosed subject matter. In some embodiments, information flow diagram 700 can occur in connection with information flow diagram 300 of FIG. 3. For example, in some embodiments, after advertisement pricing parameters are determined at block 312 of FIG. 3 (or at block 702 of FIG. 7), the seller server can determine if the advertisement placement was purchased, as shown in and described in connection with block 704 of FIG. 7, and, in some embodiments, can proceed with the blocks of information flow diagram 700 based on this determination. As shown, in some embodiments, information flow diagram 700 can be implemented on exchange server 102, measurement vendor server 104, and seller server 108.

At 702, seller server 108 can determine advertising pricing parameters, such as a floor price and/or a clearing price, based on received predicted information. Seller server 108 can use any suitable technique or combination of techniques to determine the advertising pricing parameters, such as those described above in connection with block 312 of FIG. 3.

At 704, seller server 108 can determine if the advertisement placement was purchased. In some embodiments, seller server 108 can additionally determine any other suitable information, such as an identity of a buyer of the advertisement placement, a purchase price of the advertisement placement, and/or any other suitable information.

If, at 704, it is determined that the advertisement placement was purchased ("yes" at 704), seller server 108 can cause the advertisement to be presented at 706. For example, in some embodiments, seller server 108 can cause the advertisement to be presented at a particular position within the page, in a particular size and/or format, and/or in any other suitable manner. In some embodiments, the advertisement can be transmitted to the user device presenting the page from any suitable server, such as buyer server 106.

If, at 704, it is determined that the advertisement placement was not purchased ("no" at 704), seller server 108 can transmit information acquired from a code loaded in the page associated with the advertisement placement to measurement vendor server 104, as described above in connection with block 304 of FIG. 3. As described above in connection with FIGS. 3 and 4, the information can include information relating to a browser and/or a browser version on which the page is being presented on a user device, a URL of the page, a size and/or format of the advertisement, and/or any other suitable information. Additionally, in some embodiments, the information can include information relating to whether the page is currently active and/or indicate a portion of the page that is currently being presented. For example, in some embodiments, the information can indicate that a tab opened to the URL associated with the page is currently active and/or in focus. As another example, in some embodiments, the information can indicate which portion of the page is currently being presented (e.g., the left 10%, the upper 20%, and/or any other suitable portion).

At 710, measurement vendor server 104 can calculate updated predicted information related to advertisement viewability based on the received information. As described above in connection with block 408 of FIG. 4, measurement vendor server 104 can use any suitable technique or combination of techniques to calculate the updated predicted information. The updated predicted information can be updated in any suitable manner. For example, in some embodiments, the updated predicted information can include an updated probability indicating a likelihood that an advertisement will be viewed and/or clicked based on information indicating that a particular portion of the page is currently being presented and/or that a tab presenting the page is currently active. As another example, in some embodiments, the updated predicted information can include an updated predicted duration that an advertisement will be viewed based on information indicating a rate at which a user is scrolling on the page.

At 712, measurement vendor server 104 can transmit the updated predicted information to seller server 108.

In response to receiving the updated predicted information, seller server 108 can loop back to 702 and can determine advertisement pricing parameters based on the updated predicted information. The advertisement pricing parameters can be determined using any suitable technique or combination of techniques, such as those described above in connection with block 312 of FIG. 3. The advertisement pricing parameters can be modified in any suitable manner to reflect the updated predicted information. For example, in some embodiments, if the updated predicted information indicates that a viewer of the page is relatively more likely to view and/or select the advertisement, the advertisement pricing parameters can include a relatively higher floor price. Conversely, if the updated predicted information indicates that a viewer of the page is relatively less likely to view and/or select the advertisement, the advertisement pricing parameters can include a relatively lower floor price.

Note that, in some embodiments, the blocks of information flow diagram 700 can occur any suitable number of times and at any suitable frequency (e.g., once per second, once per five seconds, and/or any other suitable frequency).

Turning to FIG. 8, an example 800 of an information flow diagram for presenting multiple bid opportunities for an advertisement placement in an open exchange is shown in accordance with some embodiments of the disclosed subject matter. In some embodiments, information flow diagram 800 can occur in connection with information flow diagram 500 of FIG. 5. For example, in some embodiments, after the buyer server determines a bid for an advertisement placement associated with a string appended to the URL of the page at block 518 of FIG. 5 (or at block 802 of FIG. 8), the exchange server can determine if the bid was accepted, as shown in and described in connection with block 804 of FIG. 8, and, in some embodiments, can proceed with the blocks of information flow diagram 800 based on this determination. In some embodiments, information flow diagram 800 can be implemented on exchange server 102, measurement vendor server 104, and buyer server 106.

At 802, buyer server 106 can determine a bid for an advertisement placement based on received predicted information, as described above in connection with block 518 of FIG. 5. As described above in connection with FIG. 5, buyer server 106 can receive the predicted information by querying measurement vendor server 104 using a string appended to a URL associated with the page corresponding to the advertisement placement.

At 804, exchange server 102 and/or seller server 108 can determine if the bid was accepted.

If, at 804, it is determined that the bid was accepted ("yes" at 804), exchange server 102 and/or seller server 108 can cause an advertisement associated with buyer server 106 to be presented on the page at 806. For example, in some embodiments, the advertisement can be presented at a particular position within the page, in a particular size and/or format, and/or in any other suitable manner.

If, at 804, it is determined that the bid was not accepted ("no" at 804), exchange server 102 can create a new bid request associated with the appended string at 808, as described above in connection with block 512 of FIG. 5. The bid request can then be transmitted from exchange server 102 to one or more buyer servers 106.

At 810, buyer server 106 can request updated information associated with the appended string of the bid request from measurement vendor server 104. As described above in connection with block 514 of FIG. 5, in some embodiments, the requested information can include a probability indicating a likelihood that the advertisement placement will be viewed and/or selected, a predicted duration of time that the advertisement placement will be viewed, and/or any other suitable information. Buyer server 106 can use any suitable technique and/or combination of techniques to request the updated information, as described above in connection with block 514 of FIG. 5. For example, in some embodiments, the request can include the appended string associated with the bid request.

At 812, measurement vendor server 104 can calculate updated predicted information related to advertisement viewability associated with an advertisement placement specified by the appended string. For example, in some embodiments, the updated predicted information can indicate an updated probability that an advertisement at a particular location will be viewed, viewed for a particular duration of time, and/or selected based on a current portion of the page being displayed and/or a current or recent scrolling speed of a user viewing the page. Measurement vendor server 104 can use any suitable technique(s) and/or information to calculate the updated predicted information, as described above in connection with block 610 of FIG. 6. The updated predicted information can then be transmitted to buyer server 802.

In response to receiving the updated predicted information, buyer server 106 can determine a new bid based on the updated predicted information. For example, in response to receiving updated predicted information indicating an increased likelihood that the user will view and/or select the advertisement, buyer server 106 can increase the bid for the advertisement placement. The new bid can then be transmitted to exchange server 102.

Note that, in some embodiments, the blocks of information flow diagram 800 can occur any suitable number of times and at any suitable frequency (e.g., once per second, once per five seconds, and/or any other suitable frequency).

It should be understood that at least some of the above described blocks of the processes of FIGS. 3-8 can be executed or performed in any order or sequence not limited to the order and sequence shown in and described in the figure. Also, some of the above blocks of the processes of FIGS. 3-8 can be executed or performed substantially simultaneously where appropriate or in parallel to reduce latency and processing times. Additionally or alternatively, some of the above described blocks of the processes of FIGS. 3-8 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for generating predicted information related to advertisement viewability are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for generating predicted information related to advertisement viewability, the method comprising:

receiving, from a user device currently presenting a web page, and via a code inserted in a web page, metrics associated with presentation of the web page on the user device, wherein the web page is associated with a seller of an advertisement placement located at a predetermined location within the web page, and wherein the metrics include device information related to the user device and browser information related to a browser on which the web page is displayed on the user device;

generating a string that includes a plurality of characters that each encode a particular value corresponding to a metric, wherein at least a first character from the plurality of characters encodes the browser information related to the browser on which the web page is displayed on the user device and wherein at least a second character from the plurality of characters encodes the device information related to the user device;

transmitting the string to a seller server corresponding to the seller, wherein the string is appended to a URL associated with the web page;

receiving, from a buyer server corresponding to a buyer of the advertisement placement, a first request for predicted information relating to advertisement viewability corresponding to the advertisement placement on the web page when the web page is presented on the user device, wherein the first request includes the string;

decoding the string to retrieve the metrics associated with the string in the first request by using each of the plurality of characters in the string as a key to a look-up table that converts a character in the string to the particular value corresponding to the metric;

generating predicted information including a predicted duration of time that an advertisement, when inserted in the advertisement placement at the predetermined location on the web page, will be viewed by a user of the user device based on historical data related to viewing of advertisements previously placed on the web page and based on the metrics retrieved using the string;

transmitting the predicted information to the buyer;

receiving, from the buyer, a second request for updated predicted information relating to advertisement viewability corresponding to the advertisement placement on the web page when the web page is presented on the user device, wherein the second request includes the string;

decoding the string to retrieve updated metrics associated with the string by using each of the plurality of characters in the string as the key to the look-up table that converts the character in the string to the particular value corresponding to the metric, wherein the updated metrics indicate a portion of the web page that is currently being presented;

generating updated predicted information including an updated predicted duration of time that an advertisement inserted in the advertisement placement on the web page when presented on the user device will be viewed based on the updated metrics; and transmitting the updated predicted information to the buyer server prior to placing a bid on the advertisement placement, wherein the buyer server places the bid on the advertisement placement in response to determining that the predicted information indicates that the advertisement inserted in the advertisement placement on the web page will be viewed is greater than a predetermined threshold value.

2. The method of claim 1, wherein the updated metrics further indicate whether a browser tab corresponding to the web page is currently active.

3. The method of claim 1, wherein the updated metrics further indicate a scrolling speed corresponding to a browser window displaying the web page.

4. The method of claim 3, wherein the updated predicted duration of time that the advertisement inserted in the advertisement placement will be viewed is based on the scrolling speed.

5. The method of claim 1, wherein the string indicates a format of the advertisement placement.

6. The method of claim 1, wherein the predicted information is generated based at least in part on historical data related to viewing of advertisements previously placed on the web page.

7. A system for generating predicted information related to advertisement viewability, the system comprising:
a hardware processor that is configured to:
receive, from a user device currently presenting a web page, and via a code inserted in a web page, metrics associated with presentation of the web page on the user device, wherein the web page is associated with a seller of an advertisement placement located at a predetermined location within the web page, and wherein the metrics include device information related to the user device and browser information related to a browser on which the web page is displayed on the user device;
generate a string that includes a plurality of characters that each encode a particular value corresponding to a metric, wherein at least a first character from the plurality of characters encodes the browser information related to the browser on which the web page is displayed on the user device and wherein at least a second character from the plurality of characters encodes the device information related to the user device;
transmit the string to a seller server corresponding to the seller, wherein the string is appended to a URL associated with the web page;
receive, from a buyer server corresponding to a buyer of the advertisement placement, a first request for predicted information relating to advertisement viewability corresponding to the advertisement placement on the web page when the web page is presented on the user device, wherein the first request includes the string;
decode the string to retrieve the metrics associated with the string in the first request by using each of the plurality of characters in the string as a key to a look-up table that converts a character in the string to the particular value corresponding to the metric;
generate predicted information including a predicted duration of time that an advertisement, when inserted in the advertisement placement at the predetermined location on the web page, will be viewed by a user of the user device based on historical data related to viewing of advertisements previously placed on the web page and based on the metrics retrieved using the string;
transmit the predicted information to the buyer;
receive, from the buyer, a second request for updated predicted information relating to advertisement viewability corresponding to the advertisement placement on the web page when the web page is presented on the user device, wherein the second request includes the string;
decode the string to retrieve updated metrics associated with the string by using each of the plurality of characters in the string as the key to the look-up table that converts the character in the string to the particular value corresponding to the metric, wherein the updated metrics indicate a portion of the web page that is currently being presented;
generate updated predicted information including an updated predicted duration of time that an advertisement inserted in the advertisement placement on the web page when presented on the user device will be viewed based on the updated metrics; and
transmit the updated predicted information to the buyer server prior to placing a bid on the advertisement placement, wherein the buyer server places the bid on the advertisement placement in response to determining that the predicted information indicates that the advertisement inserted in the advertisement placement on the web page will be viewed is greater than a predetermined threshold value.

8. The system of claim 7, wherein the updated metrics further indicate whether a browser tab corresponding to the web page is currently active.

9. The system of claim 7, wherein the updated metrics further indicate a scrolling speed corresponding to a browser window displaying the web page.

10. The system of claim 9, wherein the updated predicted duration of time that the advertisement inserted in the advertisement placement will be viewed is based on the scrolling speed.

11. The system of claim 7, wherein the string indicates a format of the advertisement placement.

12. The system of claim 7, wherein the predicted information is generated based at least in part on historical data related to viewing of advertisements previously placed on the web page.

13. A non-transitory computer-readable medium containing computer executable instructions that, when executed by a processor, cause the processor to perform a method for generating predicted information related to advertisement viewability, the method comprising:
receiving, from a user device currently presenting a web page, and via a code inserted in a web page, metrics associated with presentation of the web page on the user device, wherein the web page is associated with a seller of an advertisement placement located at a predetermined location within the web page, and wherein the metrics include device information related to the user device and browser information related to a browser on which the web page is displayed on the user device;
generating a string that includes a plurality of characters that each encode a particular value corresponding to a metric, wherein at least a first character from the plurality of characters encodes the browser information related to the browser on which the web page is displayed on the user device and wherein at least a second character from the plurality of characters encodes the device information related to the user device;

transmitting the string to a seller server corresponding to the seller, wherein the string is appended to a URL associated with the web page;

receiving, from a buyer server corresponding to a buyer of the advertisement placement, a first request for predicted information relating to advertisement viewability corresponding to the advertisement placement on the web page when the web page is presented on the user device, wherein the first request includes the string;

decoding the string to retrieve the metrics associated with the string in the first request by using each of the plurality of characters in the string as a key to a look-up table that converts a character in the string to the particular value corresponding to the metric;

generating predicted information including a predicted duration of time that an advertisement, when inserted in the advertisement placement at the predetermined location on the web page, will be viewed by a user of the user device based on historical data related to viewing of advertisements previously placed on the web page and based on the metrics retrieved using the string;

transmitting the predicted information to the buyer;

receiving, from the buyer, a second request for updated predicted information relating to advertisement viewability corresponding to the advertisement placement on the web page when the web page is presented on the user device, wherein the second request includes the string;

decoding the string to retrieve updated metrics associated with the string by using each of the plurality of characters in the string as the key to the look-up table that converts the character in the string to the particular value corresponding to the metric, wherein the updated metrics indicate a portion of the web page that is currently being presented;

generating updated predicted information including an updated predicted duration of time that an advertisement inserted in the advertisement placement on the web page when presented on the user device will be viewed based on the updated metrics; and transmitting the updated predicted information to the buyer server prior to placing a bid on the advertisement placement, wherein the buyer server places the bid on the advertisement placement in response to determining that the predicted information indicates that the advertisement inserted in the advertisement placement on the web page will be viewed is greater than a predetermined threshold value.

14. The non-transitory computer-readable medium of claim 13, wherein the updated metrics further indicate whether a browser tab corresponding to the web page is currently active.

15. The non-transitory computer-readable medium of claim 13, wherein the updated metrics further indicate a scrolling speed corresponding to a browser window displaying the web page.

16. The non-transitory computer-readable medium of claim 15, wherein the updated predicted duration of time that the advertisement inserted in the advertisement placement will be viewed is based on the scrolling speed.

17. The non-transitory computer-readable medium of claim 13, wherein the string indicates a format of the advertisement placement.

18. The non-transitory computer-readable medium of claim 13, wherein the predicted information is generated based at least in part on historical data related to viewing of advertisements previously placed on the web page.

* * * * *